United States Patent
Kim et al.

(10) Patent No.: US 11,854,450 B2
(45) Date of Patent: Dec. 26, 2023

(54) DISPLAY DEVICE PERFORMING IMAGE STICKING COMPENSATION BASED ON ACCUMULATED DEGRADATION AMOUNT, AND METHOD OF COMPENSATING IMAGE STICKING IN A DISPLAY DEVICE

(71) Applicant: SAMSUNG DISPLAY CO., LTD., Yongin-si (KR)

(72) Inventors: Jongman Kim, Seoul (KR); Hyungkeun Park, Incheon (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 79 days.

(21) Appl. No.: 17/380,431

(22) Filed: Jul. 20, 2021

(65) Prior Publication Data
US 2022/0028319 A1    Jan. 27, 2022

(30) Foreign Application Priority Data
Jul. 21, 2020 (KR) .................. 10-2020-0090210

(51) Int. Cl.
*G09G 3/20* (2006.01)

(52) U.S. Cl.
CPC ....... *G09G 3/20* (2013.01); *G09G 2300/0842* (2013.01); *G09G 2310/0267* (2013.01);
(Continued)

(58) Field of Classification Search
CPC ............ G09G 3/20; G09G 3/30–3291; G09G 2310/0267; G09G 2310/0275; G09G 2320/0233; G09G 2320/0257; G09G 2320/0242; G09G 2320/0285; G09G 2320/029–048; G09G 2330/10; G09G 2330/12; G09G 2340/16;
(Continued)

(56) References Cited

U.S. PATENT DOCUMENTS

| 2006/0011846 A1* | 1/2006 | Ozaki ................. G09G 3/20 |
| | | 250/363.03 |
| 2007/0146385 A1* | 6/2007 | Kienhoefer .......... G09G 3/22 |
| | | 345/593 |

(Continued)

FOREIGN PATENT DOCUMENTS

| KR | 1020150034948 | 4/2015 |
| KR | 1020170087093 | 7/2017 |

*Primary Examiner* — Keith L Crawley
(74) *Attorney, Agent, or Firm* — F. Chau & Associates, LLC

(57) ABSTRACT

A display device includes a display panel including a plurality of pixels, a data driver configured to provide data signals to the plurality of pixels, a scan driver configured to provide scan signals to the plurality of pixels, and a controller configured to control the data driver and the scan driver. The controller includes a volatile age memory configured to store accumulated degradation amounts for the plurality of pixels, and an internal age memory configured to store backup accumulated degradation amounts generated based on the accumulated degradation amounts. The controller is further configured to compensate input image data by selectively using the accumulated degradation amounts of the volatile age memory or the backup accumulated degradation amounts of the internal age memory.

19 Claims, 9 Drawing Sheets

(52) U.S. Cl.
CPC ............... *G09G 2310/0275* (2013.01); *G09G 2320/0257* (2013.01); *G09G 2320/046* (2013.01); *G09G 2320/048* (2013.01); *G09G 2360/12* (2013.01)

(58) Field of Classification Search
CPC ... G09G 2360/12–128; G09G 2360/16; G09G 2360/18
See application file for complete search history.

(56) References Cited

U.S. PATENT DOCUMENTS

| | | | |
|---|---|---|---|
| 2011/0074806 A1* | 3/2011 | Chen | G09G 3/20 345/589 |
| 2012/0212516 A1* | 8/2012 | Ahn | G09G 3/3233 345/77 |
| 2015/0062137 A1* | 3/2015 | Yu | G09G 3/3233 345/531 |
| 2015/0194096 A1* | 7/2015 | Chung | G09G 3/3225 345/78 |
| 2016/0086531 A1* | 3/2016 | Kwak | G09G 3/3208 345/77 |
| 2016/0098952 A1* | 4/2016 | Han | G09G 3/3225 345/76 |
| 2016/0117974 A1* | 4/2016 | Back | G09G 3/3275 345/213 |
| 2016/0372033 A1* | 12/2016 | Yoo | G09G 3/3233 |
| 2017/0213493 A1* | 7/2017 | Han | G09G 3/3208 |
| 2018/0350296 A1* | 12/2018 | Thompson | G06F 3/0673 |
| 2019/0244566 A1* | 8/2019 | Kim | G09G 3/3233 |
| 2020/0152116 A1* | 5/2020 | Chen | H04L 67/06 |

* cited by examiner

DISPLAY DEVICE PERFORMING IMAGE STICKING COMPENSATION BASED ON ACCUMULATED DEGRADATION AMOUNT, AND METHOD OF COMPENSATING IMAGE STICKING IN A DISPLAY DEVICE

CROSS-REFERENCE TO RELATED APPLICATION

This application claims priority under 35 U.S.C. § 119 to Korean Patent Application No. 10-2020-0090210, filed on Jul. 21, 2020 in the Korean Intellectual Property Office (KIPO), the disclosure of which is incorporated by reference herein in its entirety.

TECHNICAL FIELD

Embodiments of the present inventive concept relate to a display device, and more particularly, to a display device performing an image sticking compensation operation, and a method of compensating image sticking in a display device.

DISCUSSION OF RELATED ART

As a display device, such as an organic light emitting diode (OLED) display device, operates over time, driving transistors and/or OLEDs of pixels included in the display device may be degraded. If the pixels are degraded, the pixels may not emit light with desired luminance, and image sticking may be perceived in the display device. To reduce or eliminate the image sticking caused by the degradation of the pixels, the display device may perform an image sticking compensation operation that calculates accumulated degradation amounts of the pixels and compensates image data based on the accumulated degradation amounts.

However, in a case where a write operation or a read operation for an age memory in which the accumulated degradation amounts are stored is not normally performed due to an electrostatic discharge (ESD), a memory access fail, a hardware fail, etc., the image sticking compensation operation may not be accurately performed, the image data may not be accurately compensated, and thus image quality of the display device may be degraded.

SUMMARY

According to embodiments of the present inventive concept, a display device includes a display panel including a plurality of pixels, a data driver configured to provide data signals to the plurality of pixels, a scan driver configured to provide scan signals to the plurality of pixels, and a controller configured to control the data driver and the scan driver. The controller includes a volatile age memory configured to store accumulated degradation amounts for the plurality of pixels, and an internal age memory configured to store backup accumulated degradation amounts generated based on the accumulated degradation amounts. The controller is further configured to compensate input image data by selectively using the accumulated degradation amounts of the volatile age memory or the backup accumulated degradation amounts of the internal age memory.

In embodiments of the present inventive concept, the controller may further include an image sticking compensation circuit, the volatile age memory may be located outside the image sticking compensation circuit, and the internal age memory may be located inside the image sticking compensation circuit. In a first frame, the image sticking compensation circuit may calculate current degradation amounts based on the input image data, may calculate the first accumulated degradation amounts by accumulating the current degradation amounts, may write the first accumulated degradation amounts to the volatile age memory, may generate the backup accumulated degradation amounts based on the first accumulated degradation amounts, and may write the backup accumulated degradation amounts to the internal age memory. In a second frame, the image sticking compensation circuit may read second accumulated degradation amounts from the volatile age memory, may compare the second accumulated degradation amounts read from the volatile age memory and the first accumulated degradation amounts calculated in the first frame, may compensate the input image data in the second frame by using the second accumulated degradation amounts read from the volatile age memory in a first case where the second accumulated degradation amounts read from the volatile age memory are substantially equal to the first accumulated degradation amounts calculated in the first frame, and may compensate the input image data in the second frame by using the backup accumulated degradation amounts stored in the internal age memory in a second case where the second accumulated degradation amounts read from the volatile age memory are different from the first accumulated degradation amounts calculated in the first frame.

In embodiments of the present inventive concept, the image sticking compensation circuit may calculate a first checksum of the second accumulated degradation amounts read from the volatile age memory, may calculate a second checksum of the first accumulated degradation amounts calculated by accumulating the current degradation amounts, and may determine whether the second accumulated degradation amounts read from the volatile age memory are substantially equal to the first accumulated degradation amounts calculated by accumulating the current degradation amounts by comparing the first checksum and the second checksum.

In embodiments of the present inventive concept, the first accumulated degradation amounts may be calculated in units of a first pixel block, the backup accumulated degradation amounts may be calculated in units of a second pixel block, and a size of the second pixel block may be greater than a size of the first pixel block.

In embodiments of the present inventive concept, the image sticking compensation circuit may include the internal age memory, a current age calculator circuit configured to divide the input image data in the first frame into a plurality of block image data for a plurality of first pixel blocks, and to calculate the current degradation amounts for the plurality of first pixel blocks based on the plurality of block image data, an accumulated age calculator circuit configured to calculate the first accumulated degradation amounts for the plurality of first pixel blocks by accumulating the current degradation amounts for the plurality of first pixel blocks, to write the first accumulated degradation amounts for the plurality of first pixel blocks to the volatile age memory, to generate the backup accumulated degradation amounts for a plurality of second pixel blocks by merging the first accumulated degradation amounts for the plurality of first pixel blocks, and to write the backup accumulated degradation amounts for the plurality of second pixel blocks to the internal age memory, a data compensator circuit configured to read the second accumulated degradation amounts for the plurality of first pixel blocks from the volatile age memory, and an age comparator circuit configured to compare the second accumulated degradation amounts read by the data compensator circuit and the first accumulated degradation amounts calculated by the accumulated age calculator circuit, to generate a fail flag signal having a first level in the first case where the second accumulated degradation amounts read by the data compensator circuit are substantially equal to the first accumulated degradation amounts calculated by the accumulated age calculator circuit, and to generate the fail flag signal having a second level in the second case where the second accumulated degradation amounts read by the data compensator circuit are different from the first accumulated degradation amounts calculated by the accumulated age calculator circuit. In response to the fail flag signal having the first level, the data compensator circuit may compensate the input image data by using the second accumulated degradation amounts for the plurality of first pixel blocks. In response to the fail flag signal having the second level, the data compensator circuit may read the backup accumulated degradation amounts for the plurality of second pixel blocks from the internal age memory, and may compensate the input image data by using the backup accumulated degradation amounts for the plurality of second pixel blocks.

In embodiments of the present inventive concept, a size of each of the plurality of second pixel blocks may be greater than a size of each of the plurality of first pixel blocks.

In embodiments of the present inventive concept, the age comparator circuit may calculate a first checksum of the second accumulated degradation amounts read by the data compensator circuit, may calculate a second checksum of the first accumulated degradation amounts calculated by the accumulated age calculator circuit, and may generate the fail flag signal by comparing the first checksum and the second checksum.

In embodiments of the present inventive concept, the image sticking compensation circuit may further include a weight determiner circuit configured to determine block degradation weights for the plurality of the first pixel blocks based on at least one of a driving frequency of the display panel, a temperature of the display panel, and positions of the plurality of the first pixel blocks.

In embodiments of the present inventive concept, the current age calculator circuit may calculate the current degradation amounts for the plurality of first pixel blocks by applying the block degradation weights to the plurality of block image data.

In embodiments of the present inventive concept, the controller may further include a pre-scaling circuit configured to receive accumulated degradation amounts from the image sticking compensation circuit, to determine a pre-scaling coefficient based on a maximum accumulated degradation amount of the received accumulated degradation amounts, to generate pre-scaled input image data by applying the pre-scaling coefficient to the input image data, and to provide the pre-scaled input image data to the image sticking compensation circuit.

In embodiments of the present inventive concept, the display device may further include a nonvolatile age memory configured to store the accumulated degradation amounts while the display device is powered off.

In embodiments of the present inventive concept, the controller may periodically write the accumulated degradation amounts stored in the volatile age memory to the nonvolatile age memory.

According to embodiments of the present inventive concept, in a method of compensating image sticking in a display device, current degradation amounts are calculated based on input image data in a first frame, first accumulated degradation amounts are calculated by accumulating the current degradation amounts, the first accumulated degradation amounts are written to a volatile age memory located outside an image sticking compensation circuit, backup accumulated degradation amounts are generated based on the first accumulated degradation amounts, the backup accumulated degradation amounts are written to an internal age memory of the image sticking compensation circuit, second accumulated degradation amounts are read from the volatile age memory in a second frame, the second accumulated degradation amounts read from the volatile age memory and the first accumulated degradation amounts calculated by accumulating the current degradation amounts are compared, and the input image data in the second frame are compensated by selectively using the second accumulated degradation amounts read from the volatile age memory or the backup accumulated degradation amounts stored in the internal age memory according to a result of the comparison.

In embodiments of the present inventive concept, the input image data in the second frame may be compensated by using the second accumulated degradation amounts read from the volatile age memory in a first case where the second accumulated degradation amounts read from the volatile age memory are substantially equal to the first accumulated degradation amounts calculated by accumulating the current degradation amounts, and the input image data in the second frame may be compensated by using the backup accumulated degradation amounts stored in the internal age memory in a second case where the second accumulated degradation amounts read from the volatile age memory are different from the first accumulated degradation amounts calculated by accumulating the current degradation amounts.

In embodiments of the present inventive concept, a first checksum of the second accumulated degradation amounts read from the volatile age memory may be calculated, a second checksum of the first accumulated degradation amounts calculated by accumulating the current degradation amounts may be calculated, and whether the second accumulated degradation amounts read from the volatile age memory are substantially equal to the first accumulated degradation amounts calculated by accumulating the current degradation amounts may be determined by comparing the first checksum and the second checksum.

In embodiments of the present inventive concept, the first accumulated degradation amounts may be calculated in units of a first pixel block, the backup accumulated degradation amounts may be calculated in units of a second pixel block, and a size of the second pixel block may be greater than a size of the first pixel block.

In embodiments of the present inventive concept, the input image data in the first frame may be divided into a plurality of block image data for a plurality of first pixel blocks, block degradation weights for the plurality of the first pixel blocks may be determined based on at least one of a driving frequency of a display panel included in the display device, a temperature of the display panel, and positions of the plurality of the first pixel blocks, and the current degradation amounts for the plurality of first pixel blocks may be calculated by applying the block degradation weights to the plurality of block image data.

In embodiments of the present inventive concept, the backup accumulated degradation amounts for a plurality of second pixel blocks may be generated by merging the first accumulated degradation amounts for the plurality of first pixel blocks.

In embodiments of the present inventive concept, the first accumulated degradation amounts stored in the volatile age memory may be periodically written to a nonvolatile age memory.

In embodiments of the present inventive concept, a pre-scaling coefficient may be determined based on a maximum accumulated degradation amount of accumulated degradation amounts, and the pre-scaling coefficient may be applied to the input image data.

According to embodiments of the present inventive concept, a method of compensating image sticking in a display device includes generating pre-scaled input image data by applying a pre-scaling coefficient to input image data, calculating current degradation amounts based on the pre-scaled input image data in a first frame, calculating first accumulated degradation amounts by accumulating the current degradation amounts, writing the first accumulated degradation amounts to a first memory, generating backup accumulated degradation amounts based on the first accumulated degradation amounts, writing the backup accumulated degradation amounts to a second memory, reading second accumulated degradation amounts from the first memory in a second frame, comparing the second accumulated degradation amounts and the first accumulated degradation amounts, and compensating the pre-scaled input image data in the second frame by using one of the second accumulated degradation amounts or the backup accumulated degradation amounts according to a result of the comparing.

BRIEF DESCRIPTION OF THE DRAWINGS

The above and other features of the present inventive concept will be more clearly understood by describing in detail embodiments thereof with reference to the accompanying drawings.

DETAILED DESCRIPTION OF THE EMBODIMENTS

Figure 1:
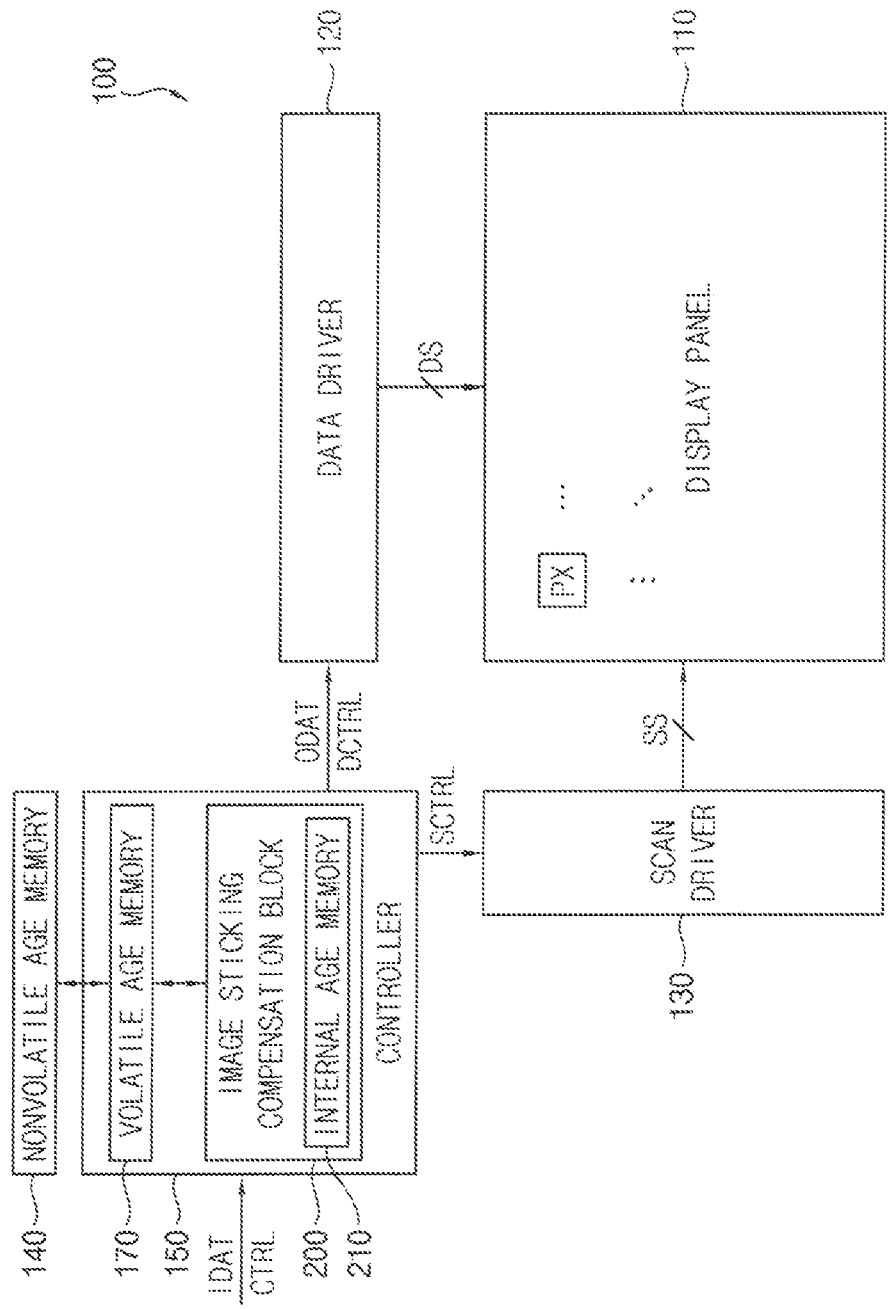
FIG. 1 is a block diagram illustrating a display device according to embodiments of the present inventive concept.

Embodiments of the present inventive concept provide a display device capable of accurately performing an image sticking compensation operation.

Embodiments of the present inventive concept also provide a method of compensating image sticking in the display device capable of accurately performing an image sticking compensation operation.

Hereinafter, embodiments of the present inventive concept will be explained in detail with reference to the accompanying drawings. Like reference numerals may refer to like elements throughout this application.

Figure 2:
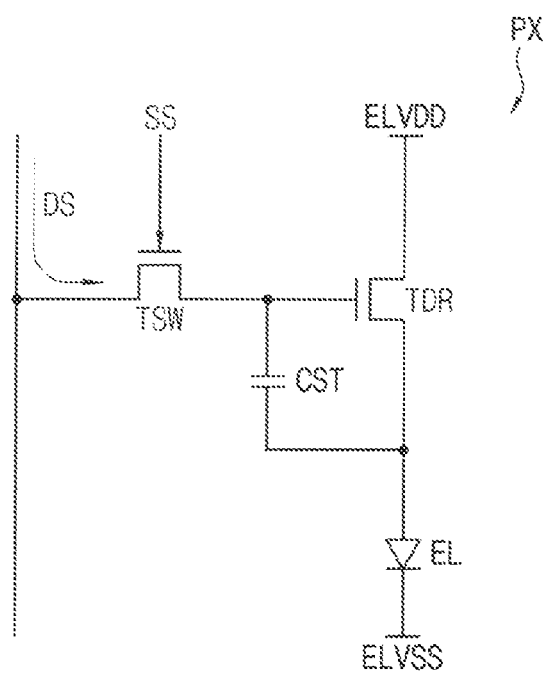
FIG. 2 is a circuit diagram illustrating a pixel included in the display device of FIG. 1 according to embodiments of the present inventive concept.
Figure 3:
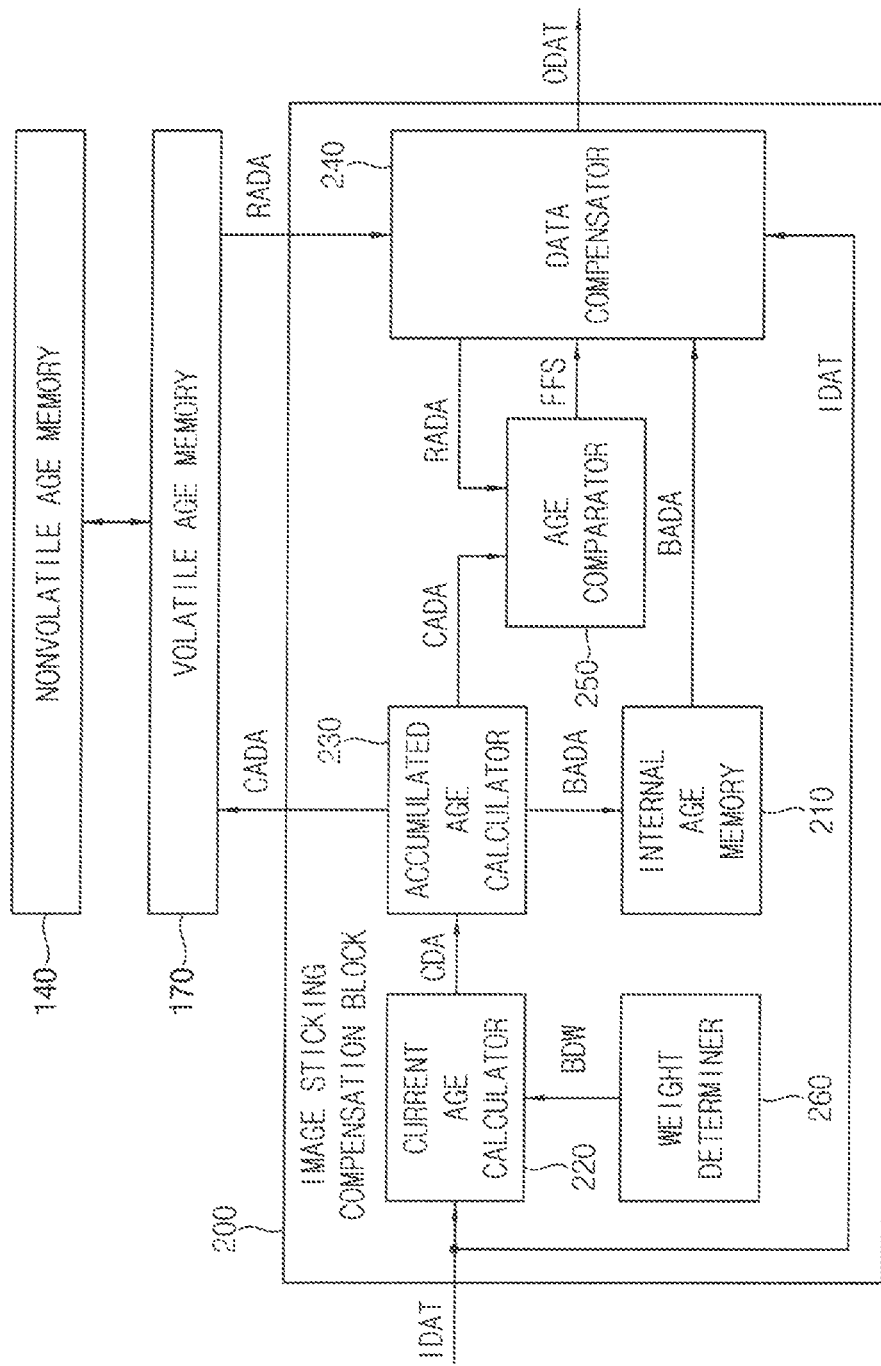
FIG. 3 is a diagram illustrating an image sticking compensation block included in the display device of FIG. 1 according to embodiments of the present inventive concept.
Figure 4:
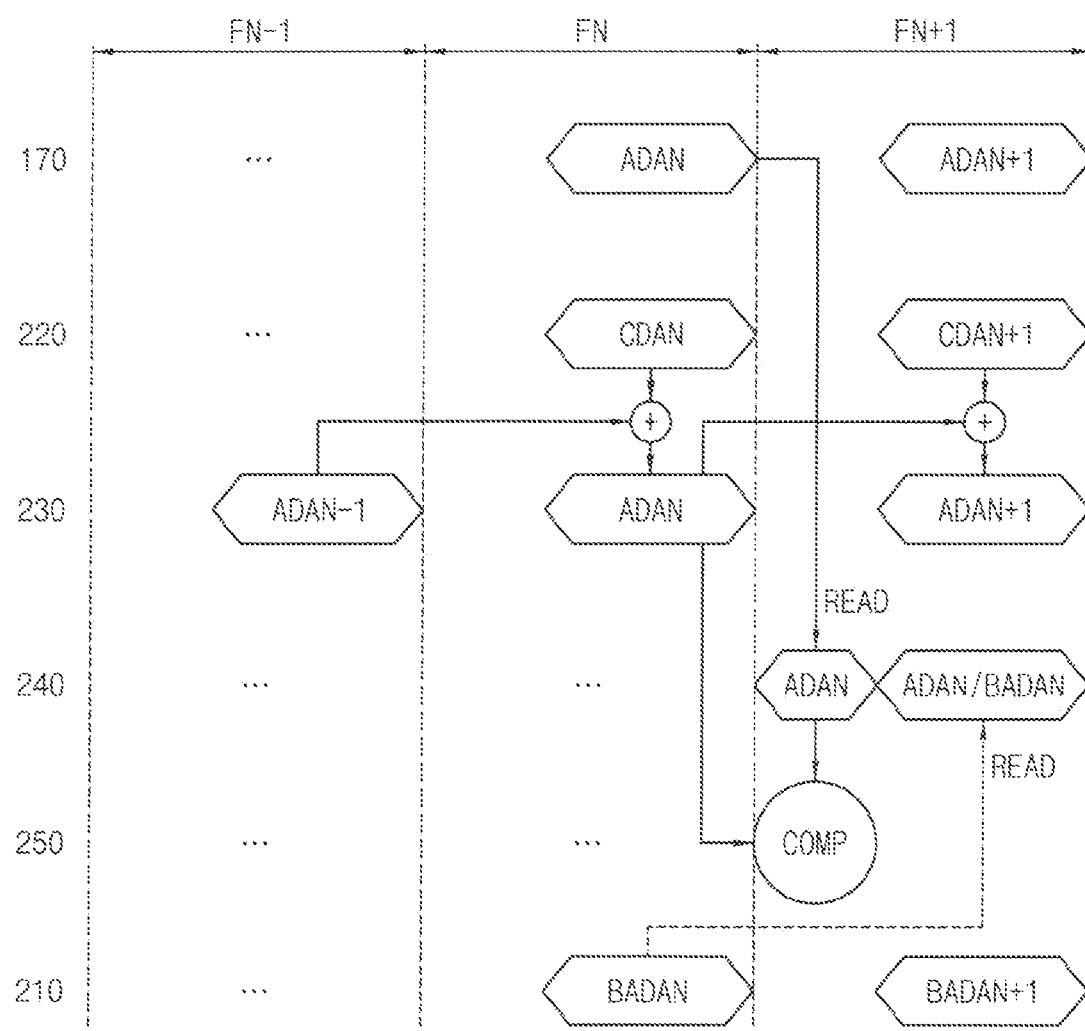
FIG. 4 is a timing diagram for describing an operation of the image sticking compensation block of FIG. 3 according to embodiments of the present inventive concept.
Figure 5:
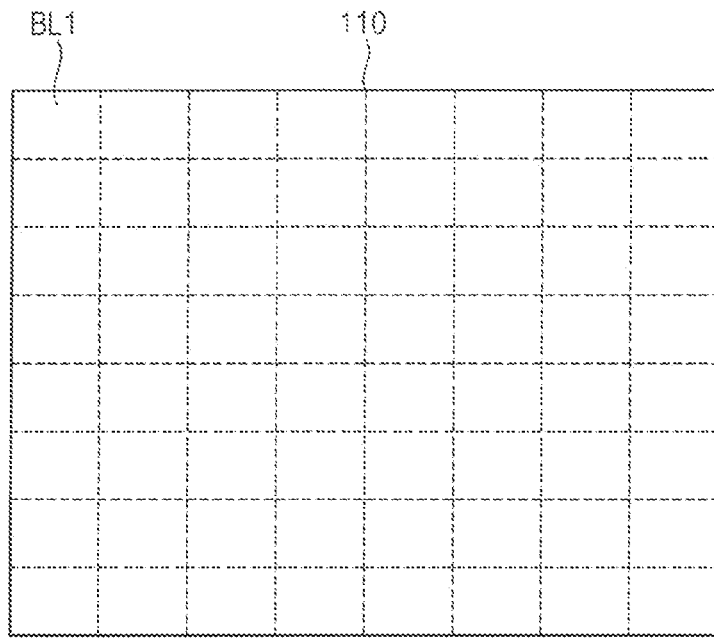
FIG. 5 is a diagram for describing a plurality of first pixel blocks for which current degradation amounts and accumulated degradation amounts are calculated according to embodiments of the present inventive concept.
Figure 6:
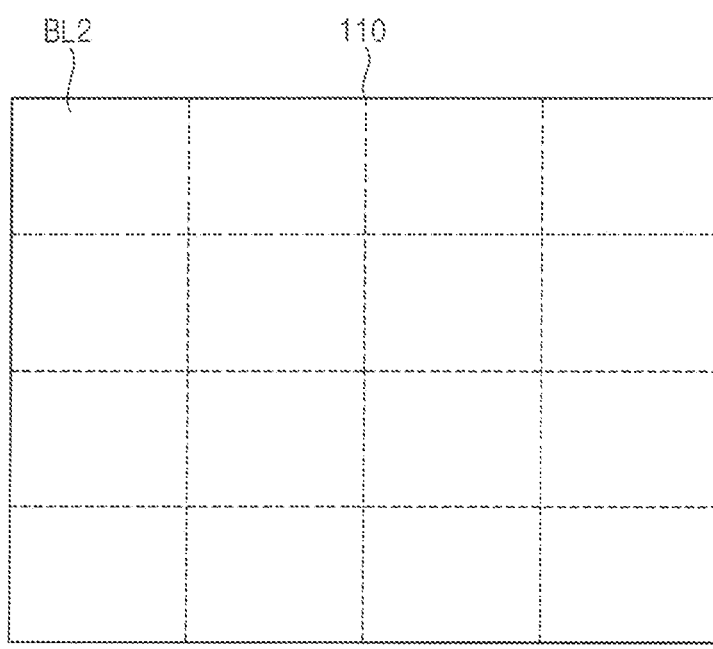
FIG. 6 is a diagram for describing a plurality of second pixel blocks for which backup accumulated degradation amounts are calculated according to embodiments of the present inventive concept.

FIG. 1 is a block diagram illustrating a display device according to embodiments of the present inventive concept. FIG. 2 is a circuit diagram illustrating the pixel of FIG. 1 included in a display device according to embodiments of the present inventive concept. FIG. 3 is a diagram illustrating an image sticking compensation block included in the display device of FIG. 1 according to embodiments of the present inventive concept. FIG. 4 is a timing diagram for describing an operation of the image sticking compensation block of FIG. 3 according to embodiments of the present inventive concept. FIG. 5 is a diagram for describing a plurality of first pixel blocks for which current degradation amounts and accumulated degradation amounts are calculated according to embodiments of the present inventive concept. FIG. 6 is a diagram for describing a plurality of second pixel blocks for which backup accumulated degradation amounts are calculated according to embodiments of the present inventive concept.

Referring to FIG. 1, a display device 100 according to embodiments of the present inventive concept may include a display panel 110 that includes a plurality of pixels PX, a data driver 120 that provides data signals DS to the plurality of pixels PX, a scan driver 130 that provides scan signals SS to the plurality of pixels PX, and a controller 150 that controls the data driver 120 and the scan driver 130. In embodiments of the present inventive concept, the display device 100 may further include a nonvolatile age memory 140.

The display panel 110 may include a plurality of data lines, a plurality of scan lines, and the plurality of pixels PX coupled to the plurality of data lines and the plurality of scan lines. In embodiments of the present inventive concept, the display panel 110 may be an organic light emitting diode (OLED) display panel where each pixel PX includes an OLED.

For example, as illustrated in FIG. 2, each pixel PX may include a switching transistor TSW that transfers the data signal DS of the data line to a storage capacitor CST in response to the scan signal SS of the scan line, the storage capacitor CST that stores the data signal DS transferred by the switching transistor TSW, a driving transistor TDR that generates a driving current based on the data signal DS stored in the storage capacitor CST, and an organic light emitting diode EL that emits light based on the driving current generated by the driving transistor TDR. The driving transistor TDR and the organic light emitting diode EL may be connected between a high power supply voltage ELVDD and a low power supply voltage ELVSS. In embodiments of the present inventive concept, as illustrated in FIG. 2, the switching transistor TSW and the driving transistor TDR may be implemented with, but are not limited to, NMOS transistors.

A configuration of the pixel PX according to embodiments of the present inventive concept is not limited to the example of FIG. 2, and the pixel PX according to embodiments of the present inventive concept may have various configurations. In embodiments of the present inventive concept, the display panel 110 may be an inorganic light emitting diode display panel, a quantum dot light emitting diode display panel, a liquid crystal display (LCD) panel, or any other suitable display panel.

Referring back to FIG. 1, the data driver 120 may generate the data signals DS based on output image data ODAT and a data control signal DCTRL received from the controller 150, and may provide the data signals DS to the plurality of pixels PX through the plurality of data lines. In embodiments of the present inventive concept, the data control signal DCTRL may include, but is not limited to, an output data enable signal, a horizontal start signal, and a load signal. In embodiments of the present inventive concept, the data driver 120 may be implemented with one or more integrated circuits separated from an integrated circuit of the controller 150. In embodiments of the present inventive concept, the data driver 120 and the controller 150 may be implemented with a single integrated circuit, and the single integrated circuit may be referred to as a timing controller embedded data driver (TED) integrated circuit.

The scan driver 130 may generate the scan signals SS based on a scan control signal SCTRL received from the controller 150, and may sequentially provide the scan signals SS to the plurality of pixels PX on a row-by-row basis based on the scan control signal SCTRL. In embodiments of the present inventive concept, the scan control signal SCTRL may include, but is not limited to, a scan start signal and a scan clock signal. In embodiments of the present inventive concept, the scan driver 130 may be integrated or formed in a peripheral portion of the display panel 110. In embodiments of the present inventive concept, the scan driver 130 may be implemented with one or more integrated circuits.

The nonvolatile age memory 140 may store accumulated degradation amounts for the plurality of pixels PX of the display panel 110, and may retain or maintain the stored accumulated degradation amounts even while the display device 100 is powered off. In embodiments of the present inventive concept, the display panel 110 may be divided into a plurality of first pixel blocks BL1 each including the plurality of pixels PX as illustrated in FIG. 5, and the nonvolatile age memory 140 may store the accumulated degradation amounts respectively for the plurality of first pixel blocks BL1.

Further, in embodiments of the present inventive concept, when the display device 100 is powered on, the controller 150 may read the accumulated degradation amounts from the nonvolatile age memory 140, and may write or store the accumulated degradation amounts to a volatile age memory 170. The volatile age memory 170 may be referred to as a first memory. An image sticking compensation block 200 of the controller 150 may read the accumulated degradation amounts from the volatile age memory 170, may update the accumulated degradation amounts for each frame while the display device 100 operates, and may write the updated accumulated degradation amounts to the volatile age memory 170 for each frame. According to embodiments of the present inventive concept, the image sticking compensation block 200 may be a circuit.

Further, the controller 150 may periodically write the accumulated degradation amounts stored in the volatile age memory 170 to the nonvolatile age memory 140. For example, the accumulated degradation amounts stored in the volatile age memory 170 may be written to the nonvolatile age memory 140 every about five minutes through about ten minutes, but a period of a write operation for the nonvolatile age memory 140 is not limited thereto. In this manner, the display device 100 may calculate and store the accumulated degradation amounts respectively for the plurality of first pixel blocks BL1 that are accumulated for a period from a time point at which the display device 100 is manufactured to a current time point. In embodiments of the present inventive concept, the nonvolatile age memory 140 may be implemented with, but is not limited to, a flash memory.

The controller 150 (e.g., a timing controller (TCON)) may receive input image data IDAT and a control signal CTRL from an external host processor (e.g., a graphic processing unit (GPU), an application processor (AP), or a graphic card). In embodiments of the present inventive concept, the input image data IDAT may be RGB image data including red image data, green image data, and blue image data. In embodiments of the present inventive concept, the control signal CTRL may include, but is not limited to, a vertical synchronization signal, a horizontal synchronization signal, an input data enable signal, a master clock signal, etc. Further, the controller 150 may generate the output image data ODAT by compensating the input image data IDAT based on the accumulated degradation amounts. The controller 150 may control an operation of the data driver 120 by providing the output image data ODAT and the data control signal DCTRL to the data driver 120, and may control an operation of the scan driver 130 by providing the scan control signal SCTRL to the scan driver 130.

In the display device 100 according to embodiments of the present inventive concept, to perform an image sticking compensation operation, the controller 150 may include the volatile age memory 170 and the image sticking compensation block 200.

The volatile age memory 170 may store the accumulated degradation amounts that are read from the nonvolatile age memory 140 when the display device 100 is powered on, and may provide the read accumulated degradation amounts to the image sticking compensation block 200. Further, while the display device 100 operates, the volatile age memory 170 may receive and store the accumulated degradation amounts updated in each frame from the image sticking compensation block 200, and may provide the stored accumulated degradation amounts to the image sticking compensation block 200 in each frame. In embodiments of the present inventive concept, the accumulated degradation amounts of the volatile age memory 170 may be periodically written to the nonvolatile age memory 140. In embodiments of the present inventive concept, the volatile age memory 170 may be implemented with, but is not limited to, a static random access memory (SRAM), a dynamic random access memory (DRAM), etc.

The image sticking compensation block 200 may include an internal age memory 210. The internal age memory 210 may be referred to as a second memory. In a first frame (e.g., a current frame), the image sticking compensation block 200 may calculate current degradation amounts based on the input image data IDAT, may calculate the accumulated degradation amounts by accumulating the current degradation amounts (and the accumulated degradation amounts read through the volatile age memory 170 from the nonvolatile age memory 140), may write the accumulated degradation amounts to the volatile age memory 170, and generate backup accumulated degradation amounts based on the accumulated degradation amounts, and may write the backup accumulated degradation amounts to the internal age memory 210.

Further, in a second frame (e.g., the next frame), the image sticking compensation block 200 may read the accumulated degradation amounts from the volatile age memory 170, may compare the accumulated degradation amounts read from the volatile age memory 170 and the accumulated degradation amounts calculated in the first frame by accumulating the current degradation amounts, and may compensate the input image data IDAT in the second frame by selectively using (e.g., using one of) the accumulated degradation amounts read from the volatile age memory 170 or the backup accumulated degradation amounts stored in the internal age memory 210 according to a result of the comparison.

In embodiments of the present inventive concept, to perform these operations, as illustrated in FIG. 3, the image sticking compensation block 200 may include the internal age memory 210, a current age calculator 220, an accumulated age calculator 230, a data compensator 240, and an age comparator 250. In embodiments of the present inventive concept, the image sticking compensation block 200 may further include a weight determiner 260. In embodiments of the present inventive concept, the current age calculator 220, the accumulated age calculator 230, the data compensator 240, the age comparator 250, and the weight determiner 260 may be circuits.

The current age calculator 220 may divide the input image data IDAT in the first frame (e.g., the current frame) into a plurality of block image data for the plurality of first pixel blocks BL1 illustrated in FIG. 5, and may calculate current degradation amounts CDA for the plurality of first pixel blocks BL1 based on the plurality of block image data. For example, each first pixel block BL1 may have, but is not limited to, a size of four pixels PX by four pixels PX, a size of eighth pixels PX by eight pixels PX, etc. In embodiments of the present inventive concept, as the block image data for each first pixel block BL1 increase, the current degradation amount CDA for the first pixel block BL1 may increase. For example, the current age calculator 220 may calculate the current degradation amount CDA for the first pixel block BL1 by summing (e.g., sixteen, sixty-four, etc.) pixel image data included in the block image data for the first pixel block BL1, but the calculation of the current age calculator 220 is not limited thereto.

In embodiments of the present inventive concept, the current age calculator 220 may receive block degradation weights BDW for the plurality of the first pixel blocks BL1 from the weight determiner 260, and may calculate the current degradation amounts CDA for the plurality of first pixel blocks BL1 by applying the block degradation weights BDW to the plurality of block image data. In embodiments of the present inventive concept, the weight determiner 260 may determine the block degradation weights BDW for the plurality of the first pixel blocks BL1 based on at least one of a driving frequency of the display panel 110, a temperature of the display panel 110, and positions of the plurality of the first pixel blocks BL1. For example, the current age calculator 220 may increase the block degradation weights BDW as the driving frequency of the display panel 110 increases.

Further, for example, the weight determiner 260 may include a weight lookup table that stores the block degradation weights BDW according to the temperature of the display panel 110 and the positions of the plurality of the first pixel blocks BL1, and may determine the block degradation weights BDW for the plurality of the first pixel blocks BL1 by using the weight lookup table. In embodiments of the present inventive concept, the current age calculator 220 may calculate an intermediate current degradation amount for each first pixel block BL1 by summing the pixel image data for the first pixel block BL1, may calculate a final current degradation amount for the first pixel block BL1 by multiplying the intermediate current degradation amount by the block degradation weight BDW for the first pixel block BL1, and may output the final current degradation amount as the current degradation amount CDA for the first pixel block BL1.

The accumulated age calculator 230 may calculate accumulated degradation amounts CADA for the plurality of first pixel blocks BL1 by accumulating the current degradation amounts CDA for the plurality of first pixel blocks BL1. In embodiments of the present inventive concept, the accumulated age calculator 230 may read previous accumulated degradation amounts in a previous driving period through the volatile age memory 170 from the nonvolatile age memory 140 when the display device 100 is powered on, and may add the current degradation amounts CDA in respective frames to the previous accumulated degradation amounts to calculate the accumulated degradation amounts CADA from when the display device is manufactured up to the respective frames in a current driving period.

The accumulated age calculator 230 may write the accumulated degradation amounts CADA for the plurality of first pixel blocks BL1 to the volatile age memory 170. In embodiments of the present inventive concept, the accumulated degradation amounts CADA stored in the volatile age memory 170 may be read by the data compensator 240 to compensate the input image data IDAT in the second frame (e.g., the next frame), and/or may be again read by the accumulated age calculator 230 to calculate the accumulated degradation amounts CADA in the second frame (e.g., the next frame).

Further, the accumulated age calculator 230 may generate the backup accumulated degradation amounts BADA for a plurality of second pixel blocks BL2 as illustrated in FIG. 6 based on the accumulated degradation amounts CADA for the plurality of first pixel blocks BL1, and may write the backup accumulated degradation amounts BADA for the plurality of second pixel blocks BL2 to the internal age memory 210. In embodiments of the present inventive concept, as illustrated in FIGS. 5 and 6, a size of each second pixel block BL2 may be greater than a size of each first pixel block BL1.

For example, each first pixel block BL1 may have, but is not limited to, a size of four pixels PX by four pixels PX, a size of eighth pixels PX by eight pixels PX, etc. Further, for example, the display panel 110 may be divided into, but is not limited to, 18*16 second pixel blocks BL2, and each second pixel block BL2 may have, but is not limited to, a size of two hundred forty pixels PX by one hundred twenty pixels PX. Thus, since the accumulated degradation amounts CADA are calculated in units of the first pixel block BL1, and the backup accumulated degradation amounts BADA are calculated in units of the second pixel block BL2 having the size greater than the size of the first pixel block BL1, a data size of the backup accumulated degradation amounts BADA may be smaller than a data size of the accumulated degradation amounts CADA. Accordingly, the internal age memory 210 of the image sticking compensation block 200 may have a size smaller than a size of the volatile age memory 170, and thus may be suitable to be formed inside the image sticking compensation block 200.

In embodiments of the present inventive concept, to generate the backup accumulated degradation amounts BADA having the data size smaller than that of the accumulated degradation amounts CADA, the accumulated age calculator 230 may generate the backup accumulated degradation amounts BADA for the plurality of second pixel blocks BL2 by merging the accumulated degradation amounts CADA for the plurality of first pixel blocks BL1.

The data compensator 240 may read accumulated degradation amounts RADA for the plurality of first pixel blocks BL1 from the volatile age memory 170 in an initial period of the second frame (e.g., the next frame). Further, in the initial period of the second frame, the age comparator 250 may compare the accumulated degradation amounts RADA (that are written to the volatile age memory 170 in the first frame) read by the data compensator 240 from the volatile age memory 170 and the accumulated degradation amounts CADA calculated in the first frame by the accumulated age calculator 230.

In embodiments of the present inventive concept, the age comparator 250 may calculate a first checksum of the accumulated degradation amounts RADA read from the volatile age memory 170, may calculate a second checksum of the accumulated degradation amounts CADA calculated by the accumulated age calculator 230, and may determine whether the accumulated degradation amounts RADA read from the volatile age memory 170 are substantially equal to the accumulated degradation amounts CADA calculated by the accumulated age calculator 230 by comparing the first checksum and the second checksum.

Further, the age comparator 250 may generate a fail flag signal FFS by comparing the first checksum and the second checksum. For example, the age comparator 250 may generate the fail flag signal FFS having a first level (e.g., a high level) in a case where the first checksum is substantially equal to the second checksum, or in a case where the read accumulated degradation amounts RADA are substantially equal to the calculated accumulated degradation amounts CADA, and may generate the fail flag signal FFS having a second level (e.g., a low level) in a case where the first checksum is different from the second checksum, or in a case where the read accumulated degradation amounts RADA are different from the calculated degradation amounts CADA.

The data compensator 240 may compensate the input image data IDAT by using the accumulated degradation amounts RADA for the plurality of first pixel blocks BL1 read from the volatile age memory 170 in a case where the read accumulated degradation amounts RADA are substantially equal to the calculated accumulated degradation amounts CADA. In embodiments of the present inventive concept, the data compensator 240 may include an age compensation lookup table that stores compensation coefficients according to gray levels and degradation amounts, may obtain the compensation coefficients for the plurality of first pixel blocks BL1 corresponding to gray levels represented by the input image data IDAT and the read accumulated degradation amounts RADA from the age compensation lookup table, and may generate the output image data ODAT by applying the compensation coefficients for the plurality of first pixel blocks BL1 to the input image data IDAT.

Further, the data compensator 240 may compensate the input image data IDAT by using the backup accumulated degradation amounts BADA stored in the internal age memory 210 in a case where the read accumulated degradation amounts RADA are different from the calculated accumulated degradation amounts CADA. For example, the data compensator 240 may obtain the compensation coefficients for the plurality of second pixel blocks BL2, corresponding to the gray levels represented by the input image data IDAT and the backup accumulated degradation amounts BADA, from the age compensation lookup table, and may generate the output image data ODAT by applying the compensation coefficients for the plurality of second pixel blocks BL2 to the input image data IDAT.

In embodiments of the present inventive concept, the data compensator 240 may receive the fail flag signal FFS from the age comparator 250, and may compensate the input image data IDAT by using the accumulated degradation amounts RADA for the plurality of first pixel blocks BL1 in response to the fail flag signal FFS having the first level. Further, in response to the fail flag signal FFS having the second level, the data compensator 240 may read the backup accumulated degradation amounts BADA for the plurality of second pixel blocks BL2 from the internal age memory 210, and may compensate the input image data IDAT by using the backup accumulated degradation amounts BADA for the plurality of second pixel blocks BL2.

Since the size of each second pixel block BL2 is greater than the size of each first pixel block BL1, an image sticking compensation operation using the backup accumulated degradation amounts BADA may not be minute, or may be coarse compared with an image sticking compensation operation using the accumulated degradation amounts RADA. However, since the image sticking compensation operation using the backup accumulated degradation amounts BADA is performed only in a period where the fail flag signal FFS has the first level, or only in a period where a write operation or a read operation for the nonvolatile age memory 140 and/or the volatile age memory 170 is not normally performed due to an electrostatic discharge (ESD), a memory access fail, a hardware fail, etc., an image quality of the display device may not be excessively degraded.

Hereinafter, an example of an operation of the image sticking compensation block 200 will be described below with reference to FIGS. 1 through 6.

Referring to FIGS. 1 through 6, in an N-th frame FN, where N is an integer greater than 1, the current age calculator 220 may calculate current degradation amounts CDAN in the N-th frame FN for the plurality of first pixel blocks BL1 based on the input image data IDAT in the N-th frame FN, and the accumulated age calculator 230 may calculate accumulated degradation amounts ADAN in the N-th frame FN for the plurality of first pixel blocks BL1 by adding the current degradation amounts CDAN in the N-th frame FN to accumulated degradation amounts ADAN−1 in an (N−1)-th frame FN−1.

In an example, the accumulated age calculator 230 may store the accumulated degradation amounts ADAN−1 in the (N−1)-th frame FN−1, and may calculate the accumulated degradation amounts ADAN in the N-th frame FN by adding the current degradation amounts CDAN in the N-th frame FN to the stored accumulated degradation amounts ADAN−1. In another example, the accumulated age calculator 230 may read the accumulated degradation amounts ADAN−1 in the (N−1)-th frame FN−1 from the volatile age memory 170 at a start time point of the N-th frame FN, and may calculate the accumulated degradation amounts ADAN in the N-th frame FN by adding the current degradation amounts CDAN in the N-th frame FN to the read accumulated degradation amounts ADAN−1. The accumulated age calculator 230 may write the accumulated degradation amounts ADAN in the N-th frame FN for the plurality of first pixel blocks BL1 to the volatile age memory 170. Further, the accumulated age calculator 230 may generate backup accumulated degradation amounts BADAN in the N-th frame FN for the plurality of second pixel blocks BL2 based on the accumulated degradation amounts ADAN in the N-th frame FN for the plurality of first pixel blocks BL1, and may write the backup accumulated degradation amounts BADAN in the N-th frame FN for the plurality of second pixel blocks BL2 to the internal age memory 210.

In an initial period of an (N+1)-th frame FN+1, the data compensator 240 may read the accumulated degradation amounts ADAN in the N-th frame FN from the volatile age memory 170, and the age comparator 250 may compare the accumulated degradation amounts ADAN in the N-th frame FN read by the data compensator 240 and the accumulated degradation amounts ADAN in the N-th frame FN calculated by the accumulated age calculator 230.

In a case where the accumulated degradation amounts ADAN in the N-th frame FN read by the data compensator 240 are substantially the same as the accumulated degradation amounts ADAN in the N-th frame FN calculated by the accumulated age calculator 230, the data compensator 240 may compensate the input image data IDAT in the (N+1)-th frame FN+1 by using the accumulated degradation amounts ADAN in the N-th frame FN for the plurality of first pixel blocks BL1 read from the volatile age memory 170.

In a case where the accumulated degradation amounts ADAN in the N-th frame FN read by the data compensator 240 are different from the accumulated degradation amounts ADAN in the N-th frame FN calculated by the accumulated age calculator 230, the data compensator 240 may read the backup accumulated degradation amounts BADAN in the N-th frame FN for the plurality of second pixel blocks BL2 from the internal age memory 210, and may compensate the input image data IDAT in the (N+1)-th frame FN+1 by using the backup accumulated degradation amounts BADAN in the N-th frame FN for the plurality of second pixel blocks BL2.

Further, in the (N+1)-th frame FN+1, the current age calculator 220 may calculate current degradation amounts CDAN+1 in the (N+1)-th frame FN+1. Further, the accumulated age calculator 230 may calculate accumulated degradation amounts ADAN+1 in the (N+1)-th frame FN+1 by adding the current degradation amounts CDAN+1 in the (N+1)-th frame FN+1 to the accumulated degradation amounts ADAN in the N-th frame FN, may write the accumulated degradation amounts ADAN+1 in the (N+1)-th frame FN+1 to the volatile age memory 170, may generate backup accumulated degradation amounts BADAN+1 in the (N+1)-th frame FN+1, and may write the backup accumulated degradation amounts BADAN+1 in the (N+1)-th frame FN+1 to the internal age memory 210.

In a conventional display device that performs an image sticking compensation operation, in a case where a write operation or a read operation for the nonvolatile age memory and/or the volatile age memory is not normally performed due to an electrostatic discharge (ESD), a memory access fail, a hardware fail, etc., the input image data may be compensated based on inaccurate accumulated degradation amounts, and an image quality of the conventional display device may be degraded.

However, in the display device 100 according to embodiments of the present inventive concept, the image sticking compensation block 200 may have the internal age memory 210, may calculate the accumulated degradation amounts CADA by accumulating the current degradation amounts CDA, may read the accumulated degradation amounts RADA from the volatile age memory 170 located outside the image sticking compensation block 200, may compare the calculated accumulated degradation amounts CADA and the read accumulated degradation amounts RADA, and may compensate the input image data IDAT by selectively using the read accumulated degradation amounts RADA or the backup accumulated degradation amounts BADA stored in the internal age memory 210 according to a result of the comparison. Accordingly, even if the write operation or the read operation for the voltage and/or nonvolatile age memories 140 and 170 located outside the image sticking compensation block 200 is not normally performed due to the ESD, the memory access fail, the hardware fail, etc., the image sticking compensation operation may be accurately performed by using the backup accumulated degradation amounts BADA of the internal age memory 210.

Figure 7:
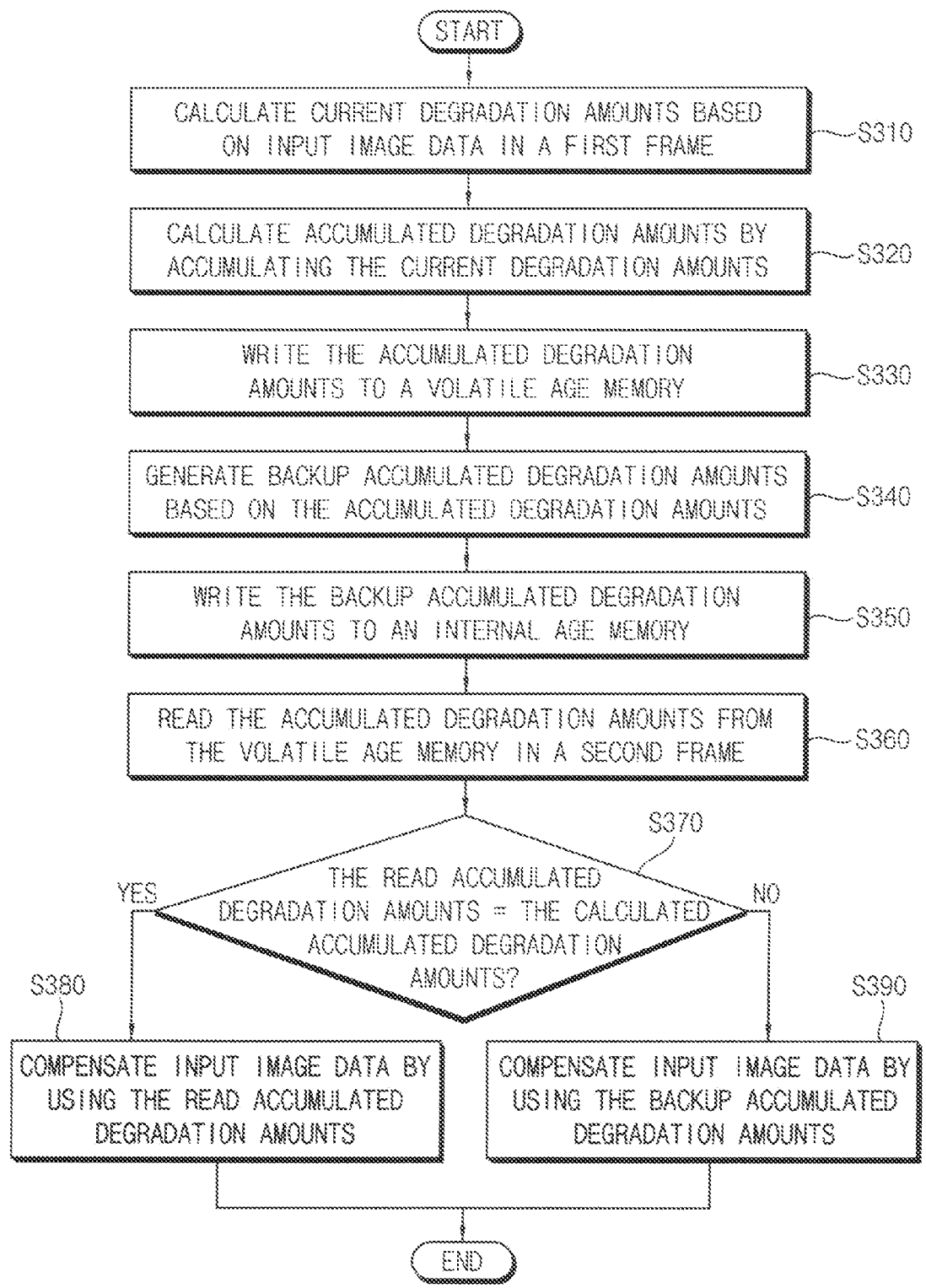
FIG. 7 is a flowchart illustrating a method of compensating image sticking in the display device of FIG. 1 according to embodiments of the present inventive concept.

FIG. 7 is a flowchart illustrating a method of compensating image sticking in the display device of FIG. 1 according to embodiments of the present inventive concept.

Referring to FIGS. 1, 3, and 7, in a first frame (e.g., a current frame), the current age calculator 220 of the image sticking compensation block 200 may calculate the current degradation amounts CDA based on the input image data IDAT (S310). In embodiments of the present inventive concept, the current age calculator 220 may divide the input image data IDAT in the first frame into a plurality of block image data for a plurality of first pixel blocks, the weight determiner 260 of the image sticking compensation block 200 may determine the block degradation weights BDW for the plurality of the first pixel blocks based on at least one of a driving frequency of a display panel 110, a temperature of the display panel 110, and positions of the plurality of the first pixel blocks, and the current age calculator 220 may calculate the current degradation amounts CDA for the plurality of first pixel blocks by applying the block degradation weights BDW to the plurality of block image data.

The accumulated age calculator 230 of the image sticking compensation block 200 may calculate the accumulated degradation amounts CADA by accumulating the current degradation amounts CDA (S320). The accumulated age calculator 230 may write the accumulated degradation amounts CADA to the volatile age memory 170 located outside the image sticking compensation block 200 (S330). In embodiments of the present inventive concept, the accumulated degradation amounts CADA stored in the volatile age memory 170 may be periodically written to the nonvolatile age memory 140.

The accumulated age calculator 230 may generate the backup accumulated degradation amounts BADA based on the accumulated degradation amounts CADA (S340), and may write the backup accumulated degradation amounts BADA to the internal age memory 210 of the image sticking compensation block 200 (S350). In embodiments of the present inventive concept, the accumulated age calculator 230 may generate the backup accumulated degradation amounts BADA for a plurality of second pixel blocks by merging the accumulated degradation amounts CADA for the plurality of first pixel blocks. Further, in embodiments of the present inventive concept, the accumulated degradation amounts CADA may be calculated in units of the first pixel block, the backup accumulated degradation amounts BADA may be calculated in units of the second pixel block, and a size of the second pixel block may be greater than a size of the first pixel block. Accordingly, a data size of the backup accumulated degradation amounts BADA may be smaller than a data size of the accumulated degradation amounts CADA, and the internal age memory 210 of the image sticking compensation block 200 may have a size smaller than a size of the volatile age memory 170.

In a second frame (e.g., the next frame), the data compensator 240 of the image sticking compensation block 200 may read the accumulated degradation amounts RADA from the volatile age memory 170 (S360), and the age comparator 250 of the image sticking compensation block 200 may compare the accumulated degradation amounts RADA read from the volatile age memory 170 and the accumulated degradation amounts CADA calculated by accumulating the current degradation amounts CDA (S370). In embodiments of the present inventive concept, the age comparator 250 may calculate a first checksum of the accumulated degradation amounts RADA read from the volatile age memory 170, may calculate a second checksum of the accumulated degradation amounts CADA calculated by accumulating the current degradation amounts CDA, and may determine whether the accumulated degradation amounts RADA read from the volatile age memory 170 are substantially equal to the accumulated degradation amounts CADA calculated by accumulating the current degradation amounts CDA, by comparing the first checksum and the second checksum.

The data compensator 240 may compensate the input image data IDAT in the second frame by selectively using the accumulated degradation amounts RADA read from the volatile age memory 170 or the backup accumulated degradation amounts BADA stored in the internal age memory 210 according to a result of the comparison (S370, S380, and S390). For example, in a case where the accumulated degradation amounts RADA read from the volatile age memory 170 are substantially equal to the accumulated degradation amounts CADA calculated by accumulating the current degradation amounts CDA (S370: YES), the data compensator 240 may compensate the input image data IDAT in the second frame by using the accumulated degradation amounts RADA read from the volatile age memory 170 (S380). Further, in a case where the accumulated degradation amounts RADA read from the volatile age memory 170 are different from the accumulated degradation amounts CADA calculated by accumulating the current degradation amounts CDA (S370: NO), the data compensator 240 may compensate the input image data IDAT in the second frame by using the backup accumulated degradation amounts BADA stored in the internal age memory 210 (S390).

As described above, in the method of compensating image sticking in the display device 100 according to embodiments of the present inventive concept, the image sticking compensation block 200 may have the internal age memory 210, may calculate the accumulated degradation amounts CADA by accumulating the current degradation amounts CDA, may read the accumulated degradation amounts RADA from the volatile age memory 170 located outside the image sticking compensation block 200, may compare the calculated accumulated degradation amounts CADA and the read accumulated degradation amounts RADA, and may compensate the input image data IDAT by selectively using the read accumulated degradation amounts RADA or the backup accumulated degradation amounts BADA stored in the internal age memory 210 according to a result of the comparison. Accordingly, even if a write operation or a read operation for voltage and/or nonvolatile age memories 140 and 170 located outside the image sticking compensation block 200 is not normally performed due to an ESD, a memory access fail, a hardware fail, etc., an image sticking compensation operation may be accurately performed by using the backup accumulated degradation amounts BADA of the internal age memory 210.

Figure 8:
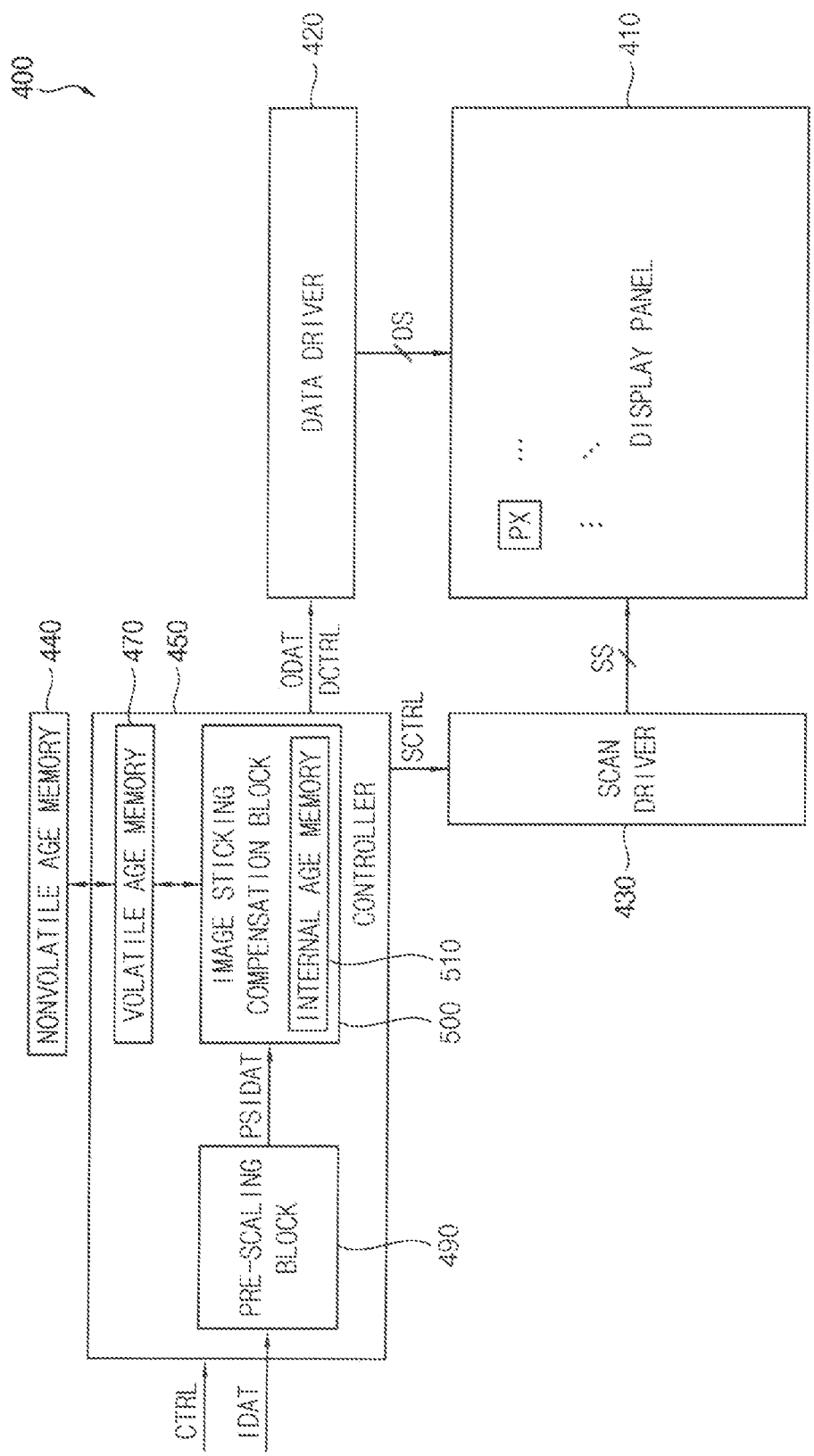
FIG. 8 is a block diagram illustrating a display device according to embodiments of the present inventive concept.

FIG. 8 is a block diagram illustrating a display device according to embodiments of the present inventive concept.

Referring to FIG. 8, a display device 400 according to embodiments of the present inventive concept may include a display panel 410, a data driver 420, a scan driver 430, a nonvolatile age memory 440, and a controller 450. The controller 450 may include a volatile age memory 470, a pre-scaling block 490, and an image sticking compensation block 500. The image sticking compensation block 500 may include an internal age memory 510. The display device 400 of FIG. 8 may have a similar configuration and a similar operation as the display device 100 of FIG. 1, except that the controller 450 may further include the pre-scaling block 490. In embodiments of the present inventive concept, the pre-scaling block 490 may be a circuit.

The pre-scaling block 490 may receive accumulated degradation amounts from the image sticking compensation block 500, may determine a pre-scaling coefficient based on the maximum accumulated degradation amount of the accumulated degradation amounts, may generate pre-scaled input image data PSIDAT by applying the pre-scaling coefficient to input image data IDAT, and may provide the pre-scaled input image data PSIDAT to the image sticking compensation block 500. In embodiments of the present inventive concept, the pre-scaling block 490 may generate the pre-scaled input image data PSIDAT that are decreased from the input image data IDAT based on the maximum accumulated degradation amount, and the image sticking compensation block 500 may generate the output image data ODAT by increasing the pre-scaled input image data PSIDAT based on the accumulated degradation amounts. Accordingly, even if the input image data IDAT represent the maximum gray level (e.g., a 255-gray level), since the input image data IDAT are pre-scaled to the pre-scaled input image data PSIDAT that are decreased from the input image data IDAT, an image sticking compensation operation that increases the pre-scaled input image data PSIDAT according to the accumulated degradation amounts may be normally performed.

Figure 9:
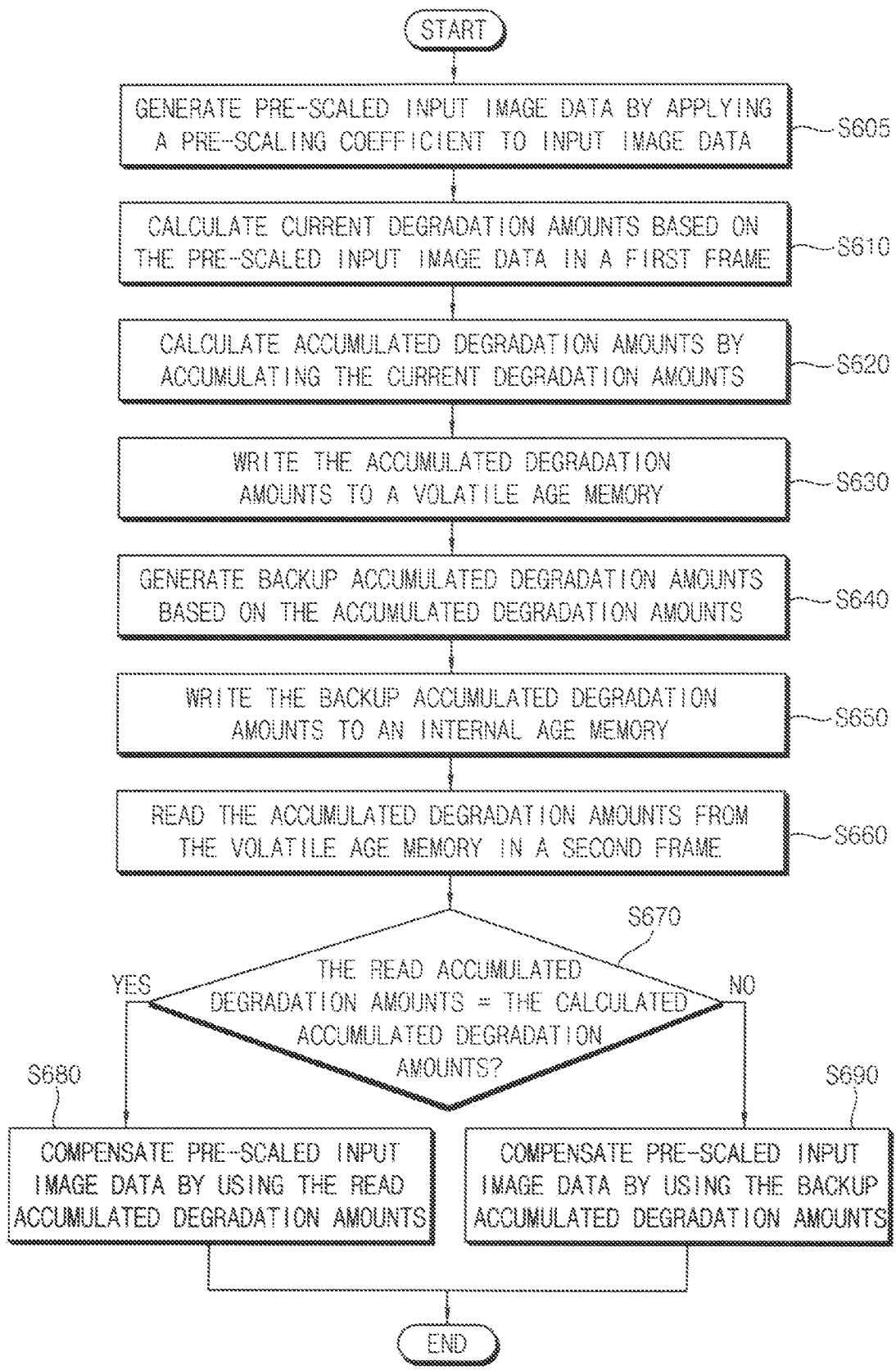
FIG. 9 is a flowchart illustrating a method of compensating image sticking in the display device of FIG. 8 according to embodiments of the present inventive concept.

FIG. 9 is a flowchart illustrating a method of compensating image sticking in the display device of FIG. 8 according to embodiments of the present inventive concept.

Referring to FIGS. 8 and 9, in a first frame (e.g., a current frame), the pre-scaling block 490 may receive accumulated degradation amounts from the image sticking compensation block 500, may determine a pre-scaling coefficient based on the maximum accumulated degradation amount of the accumulated degradation amounts, and may generate the pre-scaled input image data PSIDAT by applying the pre-scaling coefficient to the input image data IDAT (S605). The image sticking compensation block 500 may calculate current degradation amounts based on the pre-scaled input image data PSIDAT (S610), may calculate the accumulated degradation amounts by accumulating the current degradation amounts (S620), and may write the accumulated degradation amounts to the volatile age memory 470 located outside the image sticking compensation block 500 (S630). Further, the image sticking compensation block 500 may generate backup accumulated degradation amounts based on the accumulated degradation amounts (S640), and may write the backup accumulated degradation amounts to the internal age memory 510 of the image sticking compensation block 500 (S650).

In a second frame (e.g., the next frame), the image sticking compensation block 500 may read the accumulated degradation amounts from the volatile age memory 470 (S660). In a case where the accumulated degradation amounts read from the volatile age memory 470 are substantially equal to the accumulated degradation amounts calculated by accumulating the current degradation amounts (S670: YES), the image sticking compensation block 500 may compensate the pre-scaled input image data PSIDAT in the second frame by using the accumulated degradation amounts read from the volatile age memory 470 (S680). On the other hand, in a case where the accumulated degradation amounts read from the volatile age memory 470 are different from the accumulated degradation amounts calculated by accumulating the current degradation amounts (S670: NO), the image sticking compensation block 500 may compensate the pre-scaled input image data PSIDAT in the second frame by using the backup accumulated degradation amounts stored in the internal age memory 510 (S690).

Figure 10:
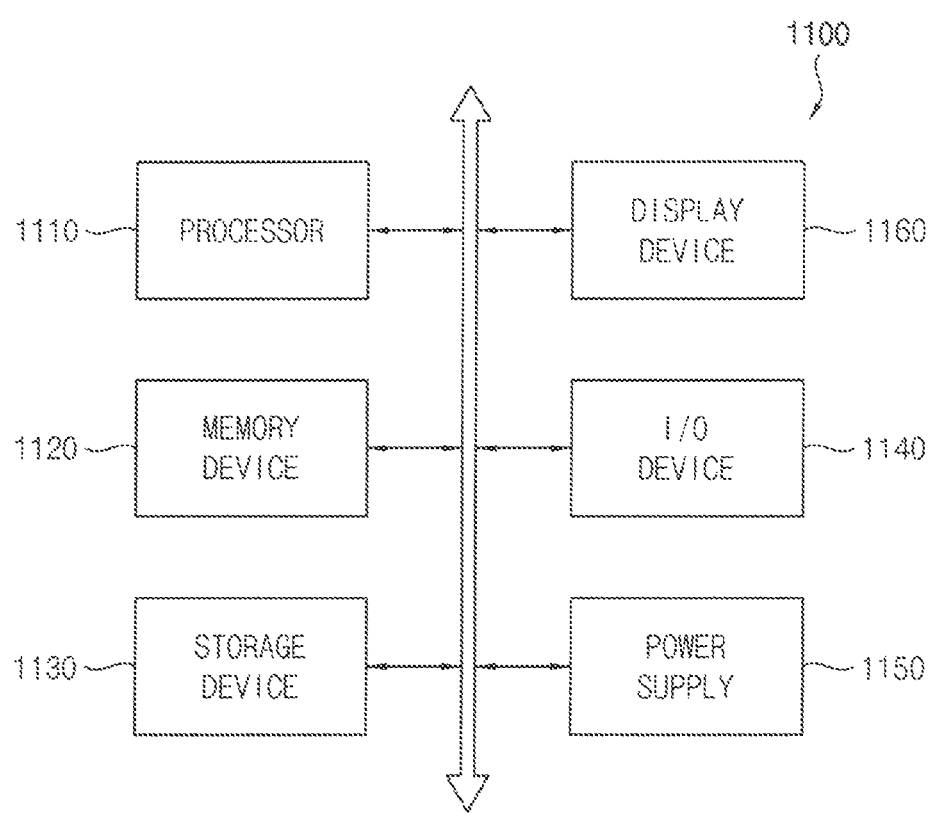
FIG. 10 is a block diagram illustrating an electronic device including a display device according to embodiments of the present inventive concept.

FIG. 10 is a block diagram illustrating an electronic device including a display device according to embodiments of the present inventive concept.

Referring to FIG. 10, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electronic devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in embodiments of the present inventive concept, the processor 1110 may be further coupled to an extended bus such as a peripheral component interconnect (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, an image sticking compensation block may have an internal age memory, may calculate accumulated degradation amounts by accumulating current degradation amounts, may read the accumulated degradation amounts from a volatile age memory located outside the image sticking compensation block, may compare the calculated accumulated degradation amounts and the read accumulated degradation amounts, and may compensate input image data by selectively using the read accumulated degradation amounts or backup accumulated degradation amounts stored in the internal age memory according to a result of the comparison. Accordingly, even if a write operation or a read operation for voltage and/or nonvolatile age memories located outside the image sticking compensation block is not normally performed due to an electrostatic discharge (ESD), a memory access fail, a hardware fail, etc., an image sticking compensation operation may be accurately performed by using the backup accumulated degradation amounts of the internal age memory.

The present inventive concept may be applied any electronic device including a display device. For example, the present inventive concept may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

As described above, in a display device and a method of compensating image sticking in the display device according to embodiments of the present inventive concept, an image sticking compensation block may have an internal age memory, may calculate accumulated degradation amounts by accumulating current degradation amounts, may read the accumulated degradation amounts from a volatile age memory located outside the image sticking compensation block, may compare the calculated accumulated degradation amounts and the read accumulated degradation amounts, and may compensate input image data by selectively using the read accumulated degradation amounts or backup accumulated degradation amounts stored in the internal age memory according to a result of the comparison. Accordingly, even if a write operation or a read operation for voltage and/or nonvolatile age memories located outside the image sticking compensation block is not normally performed due to an electrostatic discharge (ESD), a memory access fail, a hardware fail, etc., an image sticking compensation operation may be accurately performed by using the backup accumulated degradation amounts of the internal age memory.

While the present inventive concept has been shown and described with reference to embodiments thereof, it will be apparent to those of ordinary skill in the art that various modifications in form and details may be made thereto without departing from spirit and scope of the present inventive concept as set forth by the appended claims.

What is claimed is:
1. A display device comprising:
a display panel including a plurality of pixels;
a data driver configured to provide data signals to the plurality of pixels;
a scan driver configured to provide scan signals to the plurality of pixels; and
a controller configured to control the data driver and the scan driver, and including a volatile age memory configured to store first accumulated degradation amounts for the plurality of pixels calculated by accumulating current degradation amounts based on input image data in a first frame and to store second accumulated degradation amounts for the plurality of pixels and an internal age memory configured to store backup accu- mulated degradation amounts generated based on the first accumulated degradation amounts, wherein the accumulated degradation amounts are calculated in units of a first pixel block, wherein the backup accumulated degradation amounts are calculated in units of a second pixel block, wherein a size of the second pixel block is greater than a size of the first pixel block, wherein the controller is further configured to compare the second accumulated degradation amounts of the volatile age memory and the first accumulated degradation amounts calculated by accumulating the current degradation amounts, and wherein the controller is further configured to compensate the input image data in a second frame by selectively using the second accumulated degradation amounts of the volatile age memory or the backup accumulated degradation amounts of the internal age memory according to a result of the comparing.

2. The display device of claim 1, wherein the controller further includes an image sticking compensation circuit, wherein the volatile age memory is located outside the image sticking compensation circuit, wherein the internal age memory is located inside the image sticking compensation circuit, wherein, in the first frame, the image sticking compensation circuit calculates the current degradation amounts based on the input image data, calculates the first accumulated degradation amounts by accumulating the current degradation amounts, writes the first accumulated degradation amounts to the volatile age memory, generates the backup accumulated degradation amounts based on the first accumulated degradation amounts, and writes the backup accumulated degradation amounts to the internal age memory, and wherein, in the second frame, the image sticking compensation circuit reads the second accumulated degradation amounts from the volatile age memory, compares the second accumulated degradation amounts read from the volatile age memory and the first accumulated degradation amounts calculated in the first frame, compensates the input image data in the second frame by using the second accumulated degradation amounts read from the volatile age memory in a first case where the second accumulated degradation amounts read from the volatile age memory are substantially equal to the first accumulated degradation amounts calculated in the first frame, and compensates the input image data in the second frame by using the backup accumulated degradation amounts stored in the internal age memory in a second case where the second accumulated degradation amounts read from the volatile age memory are different from the first accumulated degradation amounts calculated in the first frame.

3. The display device of claim 2, wherein the image sticking compensation circuit is configured to:

calculate a first checksum of the second accumulated degradation amounts read from the volatile age memory;

calculate a second checksum of the first accumulated degradation amounts calculated by accumulating the current degradation amounts; and determine whether the second accumulated degradation amounts read from the volatile age memory are substantially equal to the first accumulated degradation amounts calculated by accumulating the current degradation amounts by comparing the first checksum and the second checksum.

4. The display device of claim 2, wherein the image sticking compensation circuit includes:

the internal age memory;

a current age calculator circuit configured to divide the input image data in the first frame into a plurality of block image data for a plurality of first pixel blocks, and to calculate the current degradation amounts for the plurality of first pixel blocks based on the plurality of block image data;

an accumulated age calculator circuit configured to calculate the first accumulated degradation amounts for the plurality of first pixel blocks by accumulating the current degradation amounts for the plurality of first pixel blocks, to write the first accumulated degradation amounts for the plurality of first pixel blocks to the volatile age memory, to generate the backup accumulated degradation amounts for a plurality of second pixel blocks by merging the first accumulated degradation amounts for the plurality of first pixel blocks, and to write the backup accumulated degradation amounts for the plurality of second pixel blocks to the internal age memory;

a data compensator circuit configured to read the second accumulated degradation amounts for the plurality of first pixel blocks from the volatile age memory; and an age comparator circuit configured to compare the second accumulated degradation amounts read by the data compensator circuit and the first accumulated degradation amounts calculated by the accumulated age calculator circuit, to generate a fail flag signal having a first level in the first case where the second accumulated degradation amounts read by the data compensator circuit are substantially equal to the first accumulated degradation amounts calculated by the accumulated age calculator circuit, and to generate the fail flag signal having a second level in the second case where the second accumulated degradation amounts read by the data compensator circuit are different from the first accumulated degradation amounts calculated by the accumulated age calculator circuit, wherein, in response to the fail flag signal having the first level, the data compensator circuit compensates the input image data by using the second accumulated degradation amounts for the plurality of first pixel blocks, and wherein, in response to the fail flag signal having the second level, the data compensator circuit reads the backup accumulated degradation amounts for the plurality of second pixel blocks from the internal age memory, and compensates the input image data by using the backup accumulated degradation amounts for the plurality of second pixel blocks.

5. The display device of claim 4, wherein a size of each of the plurality of second pixel blocks is greater than a size of each of the plurality of first pixel blocks.

6. The display device of claim 4, wherein the age comparator circuit is configured to:

calculate a first checksum of the second accumulated degradation amounts read by the data compensator circuit;

calculate a second checksum of the first accumulated degradation amounts calculated by the accumulated age calculator circuit; and generate the fail flag signal by comparing the first checksum and the second checksum.

7. The display device of claim 4, wherein the image sticking compensation circuit further includes:
a weight determiner circuit configured to determine block degradation weights for the plurality of the first pixel blocks based on at least one of a driving frequency of the display panel, a temperature of the display panel, and positions of the plurality of the first pixel blocks.

8. The display device of claim 7, wherein the current age calculator circuit calculates the current degradation amounts for the plurality of first pixel blocks by applying the block degradation weights to the plurality of block image data.

9. The display device of claim 2, wherein the controller further includes:
a pre-scaling circuit configured to receive the accumulated degradation amounts from the image sticking compensation circuit, to determine a pre-scaling coefficient based on a maximum accumulated degradation amount of the received accumulated degradation amounts, to generate pre-scaled input image data by applying the pre-scaling coefficient to the input image data, and to provide the pre-scaled input image data to the image sticking compensation circuit.

10. The display device of claim 1, further comprising:
a nonvolatile age memory configured to store the first and second accumulated degradation amounts while the display device is powered off.

11. The display device of claim 10, wherein the controller periodically writes the first and second accumulated degradation amounts stored in the volatile age memory to the nonvolatile age memory.

12. A method of compensating image sticking in a display device, the method comprising:
calculating current degradation amounts based on input image data in a first frame;
calculating first accumulated degradation amounts by accumulating the current degradation amounts;
writing the first accumulated degradation amounts to a volatile age memory located outside an image sticking compensation circuit;
generating backup accumulated degradation amounts based on the first accumulated degradation amounts;
writing the backup accumulated degradation amounts to an internal age memory of the image sticking compensation circuit;
reading second accumulated degradation amounts from the volatile age memory in a second frame;
comparing the second accumulated degradation amounts read from the volatile age memory and the first accumulated degradation amounts calculated by accumulating the current degradation amounts; and
compensating the input image data in the second frame by selectively using the second accumulated degradation amounts read from the volatile age memory or the backup accumulated degradation amounts stored in the internal age memory according to a result of the comparing.

13. The method of claim 12, wherein compensating the input image data includes:
compensating the input image data in the second frame by using the second accumulated degradation amounts read from the volatile age memory in a first case where the second accumulated degradation amounts read from the volatile age memory are substantially equal to the first accumulated degradation amounts calculated by accumulating the current degradation amounts; and
compensating the input image data in the second frame by using the backup accumulated degradation amounts stored in the internal age memory in a second case where the second accumulated degradation amounts read from the volatile age memory are different from the first accumulated degradation amounts calculated by accumulating the current degradation amounts.

14. The method of claim 12, wherein comparing the second accumulated degradation amounts read from the volatile age memory and the first accumulated degradation amounts calculated by accumulating the current degradation amounts includes:
calculating a first checksum of the second accumulated degradation amounts read from the volatile age memory;
calculating a second checksum of the first accumulated degradation amounts calculated by accumulating the current degradation amounts; and
determining whether the second accumulated degradation amounts read from the volatile age memory are substantially equal to the first accumulated degradation amounts calculated by accumulating the current degradation amounts by comparing the first checksum and the second checksum.

15. The method of claim 12, wherein the first accumulated degradation amounts are calculated in units of a first pixel block,
wherein the backup accumulated degradation amounts are calculated in units of a second pixel block, and
wherein a size of the second pixel block is greater than a size of the first pixel block.

16. The method of claim 12, wherein calculating the current degradation amounts includes:
dividing the input image data in the first frame into a plurality of block image data for a plurality of first pixel blocks;
determining block degradation weights for the plurality of the first pixel blocks based on at least one of a driving frequency of a display panel included in the display device, a temperature of the display panel, and positions of the plurality of the first pixel blocks; and
calculating the current degradation amounts for the plurality of first pixel blocks by applying the block degradation weights to the plurality of block image data.

17. The method of claim 16, wherein generating the backup accumulated degradation amounts includes:
generating the backup accumulated degradation amounts for a plurality of second pixel blocks by merging the first accumulated degradation amounts for the plurality of first pixel blocks.

18. The method of claim 12, further comprising:
determining a pre-scaling coefficient based on a maximum accumulated degradation amount of accumulated degradation amounts; and
applying the pre-scaling coefficient to the input image data.

19. A display device comprising:
a display panel including a plurality of pixels;
a data driver configured to provide data signals to the plurality of pixels;
a scan driver configured to provide scan signals to the plurality of pixels; and
a controller configured to control the data driver and the scan driver, and including a volatile age memory configured to store accumulated degradation amounts for the plurality of pixels and an internal age memory configured to store backup accumulated degradation amounts generated based on the accumulated degradation amounts, wherein the controller is further configured to compensate input image data by selectively using the accumulated degradation amounts of the volatile age memory or the backup accumulated degradation amounts of the internal age memory, wherein the controller further includes an image sticking compensation circuit, wherein the volatile age memory is located outside the image sticking compensation circuit, wherein the internal age memory is located inside the image sticking compensation circuit, wherein, in a first frame, the image sticking compensation circuit calculates current degradation amounts based on the input image data, calculates first accumulated degradation amounts by accumulating the current degradation amounts, writes the first accumulated degradation amounts to the volatile age memory, generates the backup accumulated degradation amounts based on the first accumulated degradation amounts, and writes the backup accumulated degradation amounts to the internal age memory, and wherein, in a second frame, the image sticking compensation circuit reads second accumulated degradation amounts from the volatile age memory, compares the second accumulated degradation amounts read from the volatile age memory and the first accumulated degradation amounts calculated in the first frame, compensates the input image data in the second frame by using the second accumulated degradation amounts read from the volatile age memory in a first case where the second accumulated degradation amounts read from the volatile age memory are substantially equal to the first accumulated degradation amounts calculated in the first frame, and compensates the input image data in the second frame by using the backup accumulated degradation amounts stored in the internal age memory in a second case where the second accumulated degradation amounts read from the volatile age memory are different from the first accumulated degradation amounts calculated in the first frame.

* * * * *